US010800384B2

(12) United States Patent
Herrmann

(10) Patent No.: US 10,800,384 B2
(45) Date of Patent: Oct. 13, 2020

(54) LENS CLEANER WITH BENDING ACTUATOR

(71) Applicant: SMR Patents S.à.r.l., Luxembourg (LU)

(72) Inventor: Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 72 days.

(21) Appl. No.: 15/189,353

(22) Filed: Jun. 22, 2016

(65) Prior Publication Data

US 2016/0368462 A1 Dec. 22, 2016

(30) Foreign Application Priority Data

Jun. 22, 2015 (EP) ..................................... 15173201

(51) Int. Cl.
*B60S 1/66* (2006.01)
*B60S 1/08* (2006.01)
(Continued)

(52) U.S. Cl.
CPC ................ *B60S 1/66* (2013.01); *B08B 1/002* (2013.01); *B60R 1/0602* (2013.01);
(Continued)

(58) Field of Classification Search
CPC .......... B60S 1/66; B60S 1/002; B60S 1/0602; B60S 1/46; B60S 1/06; B60S 1/08;
(Continued)

(56) References Cited

U.S. PATENT DOCUMENTS 3,704,481 A * 12/1972 Fennell ..................... B60S 1/60
15/250.002
4,719,661 A * 1/1988 Hanselmann .......... B60S 1/0402
15/250.04
(Continued)

FOREIGN PATENT DOCUMENTS

DE 102005005504 A1 8/2005
DE 102013213415 A1 1/2015
WO WO 2013186498 A1 * 12/2013 .............. B60S 1/524

OTHER PUBLICATIONS

European Search Report, Application No. EP 15173201.3, dated Mar. 11, 2016.
(Continued)

*Primary Examiner* — Monica S Carter
*Assistant Examiner* — Katina N. Henson
(74) *Attorney, Agent, or Firm* — MacMillan, Sobanski & Todd, LLC

(57) ABSTRACT

The invention relates to a cleaning device for cleaning an optical device of a motor vehicle, wherein the cleaning device features at least two cleaning units and at least one holder upon which the cleaning units are arranged. Each cleaning unit has a drive part and a cleaning part, wherein the drive part features an electroactive polymer and can at least partly move the cleaning part. The holder on which the cleaning units are arranged can move between a working position, in which the cleaning units are positioned relative to the optical device in such a manner that the drive part can move the cleaning parts across a surface of the optical device that is to be cleaned, and a rest position, in which the cleaning units are positioned away from the optical device. The cleaning device is embodied in such a manner that each cleaning part of the cleaning units is moved over a subarea
(Continued)

assigned to it of the surface to be cleaned, wherein the subareas can at least partly overlap.

11 Claims, 2 Drawing Sheets

(51) Int. Cl.
    *B08B 1/00*     (2006.01)
    *B60R 1/06*     (2006.01)
    *B60S 1/56*     (2006.01)

(52) U.S. Cl.
    CPC ............... *B60S 1/0848* (2013.01); *B60S 1/56* (2013.01); *B60S 1/566* (2013.01)

(58) Field of Classification Search
    CPC .... B60S 1/254; B60S 1/38; B60S 1/50; B60S 2001/3829; B60S 2001/3836; B60R 1/081; B60R 1/0602; B60R 11/04
    USPC ...................................................... 15/250.03
    See application file for complete search history.

(56) References Cited

U.S. PATENT DOCUMENTS

2003/0057909 A1    3/2003    Tsukui et al.
2009/0307861 A1*  12/2009    Lin ....................... B60R 1/0602
                                                           15/250.003
2010/0065232 A1    3/2010    Browne et al.

OTHER PUBLICATIONS

Communication of the European Patent Office, Decision to grant EP15173201.3 dated Apr. 2, 2019 (with translation).

* cited by examiner

LENS CLEANER WITH BENDING ACTUATOR

CROSS-REFERENCE TO RELATED APPLICATIONS

This application claims priority from European Patent Application No. EP 15173201.3 filed on Jun. 22, 2015. The disclosure of this application is incorporated herein by reference in its entirety.

BACKGROUND OF THE INVENTION

The invention relates to a cleaning device for cleaning an optical device, especially a lens and/or other transparent or partially transparent parts of an optical device whose quality can be affected by soiling or fogging due to moisture for example.

Assistance systems are being used in vehicles to an increasing extent, for example to improve the driver's overview when reversing into a parking space, or else to take over or control other tasks such as recognizing lane markings or traffic signs. The assistance systems often need cameras with appropriate optical devices, wherein the image optically recorded for the camera can be shown enlarged, reduced and/or purposely distorted, such as when forming an image of a particular area on a vehicle rearview camera and/or when electronically analyzing the camera signal to detect and evaluate lane markings or traffic sign information for example.

Such optical devices can fog up or soil, necessitating a cleaning device to ensure the quality of the optical system and consequently the function of the corresponding assistance system.

Optical devices can have at least partly curved surfaces that cannot be cleaned or only be inadequately cleaned with conventional wiping elements. As a rule, conventional cleaning systems furthermore have servomotors and gear elements which make the cleaning facility expensive to manufacture and maintenance-prone.

Thus, it would be desirable to provide a cleaning device that is inexpensive to manufacture, operates low-maintenance and preferably is also able to adequately clean curved surfaces.

SUMMARY OF THE INVENTION

The invention provides a maintenance device for cleaning an optical device, especially an optical device of a motor vehicle.

The cleaning device according to the invention has at least two cleaning units and at least one holder upon which the cleaning units are arranged. Each cleaning unit has a drive part and a cleaning part, wherein the drive part features an active material, preferably an electroactive polymer or similar materials, and can at least partly move the cleaning part. The material of the cleaning part can feature a surface which absorbs and/or wipes away the corresponding moisture condensation or other soiling. The cleaning part can also be arranged on the drive part or be embodied with the drive part as an integral unit. The holder on which the cleaning units are arranged can move between a working position, in which the cleaning units are positioned relative to the optical device in such a manner that the drive part can move the cleaning parts across a surface of the optical device that is to be cleaned, and a rest position, in which the cleaning units are positioned away from the optical device. When using a plurality of holders, at least one of the holders can be moved between a working position and a rest position. The holder can be moved between the working position and the rest position by means of a servomotor with or without gear parts or with an active material. In addition, the holder itself can at least partially feature an active material and thus support or take over the positioning of the cleaning parts and/or the movement of the cleaning parts.

The cleaning device is embodied in such a manner that each cleaning part of the cleaning units is moved over a subarea assigned to it of the surface to be cleaned, wherein the subareas can at least partly overlap. Cleaning of complex surfaces, such as surfaces with a curvature, can thus also be accomplished.

Optionally, the drive part can move the cleaning part along and/or perpendicular to the longitudinal axis of the corresponding cleaning unit. The cleaning part standing in contact with the optical device when in the working position can execute a linear back-and-forth movement and/or can move itself on a curved path or in circles. This can be achieved by a curvature of the drive part, wherein the curved part moves vertically or horizontally to an imagined surface of the optical device. Different cleaning units can move their respective cleaning part differently, i.e. on different paths and/or in different directions and/or at different times. It is also possible to perform a targeted cleaning process, which uses the optical device and a downstream camera to determine the type and/or degree and/or position of the soiling and selectively remove it.

The cleaning part can be separated from the drive part. Alternatively, the cleaning part can be arranged on or at the drive part. For example, cleaning bristles can be embodied on at least part of the drive part. The cleaning part can be arranged on one end of the cleaning unit, wherein the end on which it is arranged is spatially separated from the holder. The cleaning parts can also feature different materials for different cleaning actions, such as a soft felt to remove a fog or slight soiling and plastic bristles and/or wiper lips to remove drops or other coarse soiling.

The optical device to be cleaned can also feature a curved surface, wherein when in the cleaning position, the cleaning units can at least be partially positioned and moved in such a manner that the surface can also be cleaned in curved areas.

The invention further relates to a driver assistance system having an optical device and a cleaning device according to the invention. Driver assistance system is understood to mean any system that can control, and/or facilitate and/or take over tasks. Common driver assistance systems at the current time are for example, lane keeping assistance, brake assist, high-beam assist, emergency brake assist, parking assistant, road sign assistance, night-vision driver assistance, distance control assist, etc.

The driver assistance system can feature a controller to activate the cleaning process. The activation may take place on the basis of manual release or automatic release, for example when a threshold is exceeded or not met. A manual release can be initiated by the user. An automatic release can occur when activating the assistance system and/or in particular intervals. For an automatic release based on a threshold, the threshold can be adjusted so that a cleaning action is triggered upon reaching a certain degree of soiling of the optical system beyond which the driver assistance system can no longer operate without problem.

The invention furthermore relates to a motor vehicle rearview mirror with an optical system and a cleaning device according to the invention.

Various aspects of this invention will become apparent to those skilled in the art from the following detailed description of the preferred embodiment, when read in light of the accompanying drawings.

BRIEF DESCRIPTION OF THE DRAWINGS

The following schematic drawings represent exemplary embodiments to improve the understanding of the invention, wherein the drawing shows

DETAILED DESCRIPTION OF THE PREFERRED EMBODIMENTS

Figure 1:
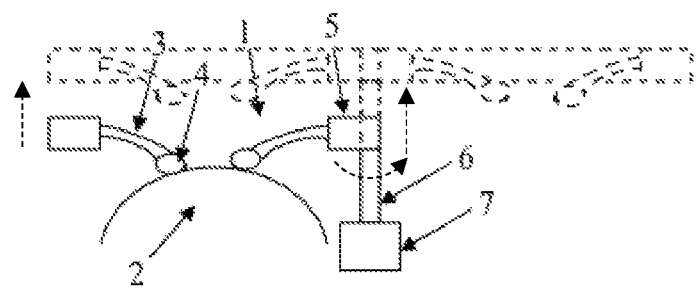
FIG. 1 is a schematic cross-sectional view of a cleaning device according to the invention.

FIG. 1 depicts a schematic cross-sectional view of a cleaning device according to the invention. Cleaning units 1 have a drive part 3 and a cleaning part 4. An optical device 2 can be cleaned in that the drive part 3 moves the cleaning part 4 over particular areas of the optical device 2. To this end, the drive part 3 features an active material, especially an electroactive polymer. The drive part 3 can be deformed similarly like a muscle so that the cleaning part 4 executes a movement on an area to be cleaned, especially a predetermined subarea. An effective cleaning result can thus be achieved by the cooperation of a plurality of cleaning units 1. This is also applicable to curved and/or complexly shaped surfaces in particular.

The cleaning units 1 can be arranged on a holder 5, wherein the cleaning units 1 can also be distributed over a plurality of holders 5, e.g. two, three, four, five or more holders 5 each feature one, two, three, four, five or more cleaning units 1.

A guide 6 can connect the holder 5 to a positioning drive 7. This permits the holder 5 and consequently the cleaning unit 1 to be moved between a working position, as illustrated in FIG. 1, and an example of a rest position illustrated in dashed lines. The rest position is not of special meaning for the present invention, but should however be so as not to restrict the functioning of the optical device 2. Moreover, the rest position can be so as to protect at least the cleaning parts 4 and/or other parts of the cleaning device from soiling. When a plurality of holders 5 are used, all or only some of the holders 5 can be moved between a working position and a rest position. The holders 5 can also be moved separately from each other, for different cleaning actions for example, wherein the cleaning parts 4 having materials adapted for the soiling can be used.

Figure 2A:
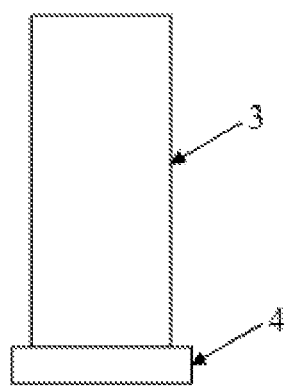
FIG. 2a is a schematic view of an embodiment of a cleaning unit.
Figure 2B:
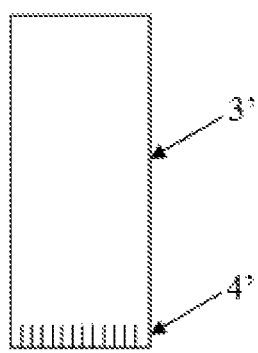
FIG. 2b is a schematic view of another embodiment of a cleaning unit.

FIGS. 2a and 2b depict exemplary, schematic views of a cleaning unit 1. In the cleaning unit 1 according to FIG. 2a, a cleaning unit 4 is arranged on the end of drive part 3 that is spatially separated from the holder 5. The cleaning part 4 can also be arranged at least partly on the drive part 3. The cleaning part 4 can also be directly formed by a part of the drive part 3. The cleaning part 4 can feature cleaning bristles or a felt or other suitable cleaning materials. The cleaning materials used for the cleaning part 4 should be matched to the optical device 2 to be cleaned, i.e. to the material of the optical device 2 and/or to the area to be cleaned and/or to the soiling or condensation to be expected. In an alternative embodiment of a cleaning unit according to FIG. 2b, a cleaning part 4' is formed by cleaning bristles which are arranged on the end of a drive part 3' spatially separated from the holder 5. In a cleaning device according to the invention, it is possible to use a plurality of cleaning units 1 or different cleaning units 1, with cleaning parts 4 and/or 4' having different materials for example.

Figure 3:
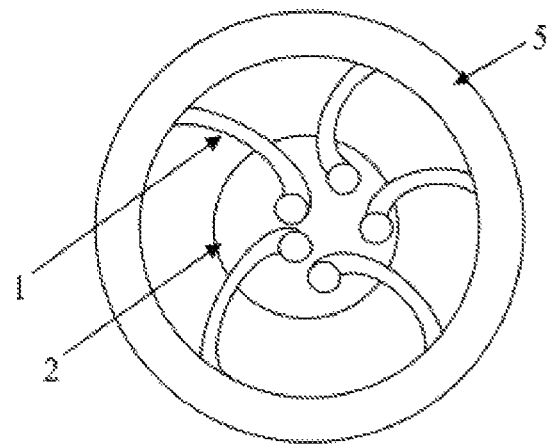
FIG. 3 is a schematic top view of a cleaning device according to the invention in a working position.

FIG. 3 depicts a schematic top view of a cleaning device according to the invention in a working position. The holder 5 on which the cleaning units 1 are arranged is embodied annular. The cleaning units 1 are configured in such a manner that, when in the working position, the cleaning parts 4 touch certain partial areas of the surface of the optical device 2 to be cleaned and execute appropriate movements during the cleaning process in order to clean a corresponding partial area. The holder 5 can also be formed out of two or a plurality of parts on each of which one or a plurality of cleaning units 1 are arranged. The arrangement of the cleaning parts 4 on the optical device 2 so that cleaning can take place can be achieved by appropriate positioning of the holder 5 and/or appropriate positioning of the cleaning units 1 on the holder 5 and/or appropriate controlling of the drive parts 3. For example, moving the holder 5 from the rest position into the working position can already at least partly bring the cleaning parts 4 into a position from which the cleaning movement can start.

Figure 4:
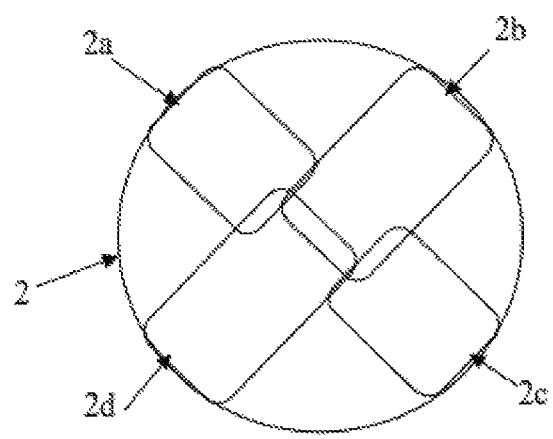
FIG. 4 is a schematic illustration of various subareas of a surface to be cleaned.

As schematically illustrated in FIG. 4, the cleaning parts 4 can clean different subareas of the optical device 2. To this end, the subareas can more or less at least partly overlap, on the edge areas for example. For sake of clarity, FIG. 4 depicts only a few partial areas that do not clean the entire surface. Preferably, the entire surface or optically required surface of the optical device 2 will be cleaned. To this end, it is possible to use two, three, four, five, six, seven or more cleaning units 1, wherein each cleaning unit 1 can clean one partial area. The cleaning units 1 can move differently from each other and be temporally and/or spatially offset from each other in such a manner that no collisions will occur. Thus the cleaning elements 4 responsible for partial areas 2a to 2d can be moved so that no two cleaning elements 4 ever simultaneously clean the area most distant from the edge of the optical device 2 in order to prevent a collision in the overlapping areas. The cleaning units 1 can also be embodied so as to at least partly allow a collision of several or a plurality of or all cleaning parts 4. The cleaning units 1 are preferably flexible so that a collision will not lead to any damage or faults during the current or subsequent cleaning processes.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A cleaning device for cleaning an optical device of a motor vehicle, wherein the cleaning device features: at least two cleaning units, wherein each cleaning unit has a drive part and a cleaning part, wherein the drive parts features an electroactive polymer and can at least partly move the cleaning parts; at least one holder on which the cleaning units are arranged, wherein the holder is has an annular shape and moves between a working position, in which the holder positions the cleaning units relative to the optical device in such a manner that the drive parts can move the cleaning parts across a surface of the optical device that is to be cleaned, and a rest position, in which the holder positions the cleaning units away from the optical device, wherein the cleaning device is embodied in such a manner that each cleaning parts of the cleaning units is moved over a subarea assigned to it of the surface to be cleaned, wherein the subareas can at least partly overlap.

2. The cleaning device according to claim 1, wherein the drive parts moves the cleaning parts along and perpendicular to the longitudinal axis of the cleaning unit.

3. The cleaning device according to claim 1, wherein the cleaning parts features cleaning bristles.

4. The cleaning device according to claim 1, wherein the cleaning parts is arranged at least on one end of a cleaning unit, wherein the end on which it is arranged is spatially separated from the holder.

5. The cleaning device according to claim 1, wherein the optical device to be cleaned features a curved surface and, when in the cleaning position, the cleaning units are positioned and can move in such a manner that the surface can also be cleaned in curved areas.

6. A driver assistance system having an optical device and a cleaning device according to claim 1.

7. A motor vehicle rearview mirror having an optical system and a cleaning device according to claim 1.

8. The cleaning device according to claim 1, wherein the drive parts moves the cleaning parts along or perpendicular to the longitudinal axis of the cleaning unit.

9. The driver assistance system according to claim 6, further comprising a controller to activate the cleaning process on the basis of manual release or on the basis of a threshold being exceeded or not met.

10. The driver assistance system according to claim 9, wherein the threshold is adjusted so that a cleaning action is triggered upon reaching a certain degree of soiling of the optical system beyond which the driver assistance system can no longer operate without problem.

11. A cleaning device for cleaning an optical device of a motor vehicle, wherein the cleaning device features: at least two cleaning units, wherein each cleaning unit has a drive part and a cleaning part, wherein the drive parts features an electroactive polymer and can at least partly move the cleaning parts such that the at least two cleaning units can each move their respective cleaning part on at least one of different paths, different directions or at different times; at least one holder on which the cleaning units are arranged, wherein the holder has an annular shape and moves between a working position, in which the holder positions the cleaning units relative to the optical device in such a manner that the drive parts can move the cleaning parts across a surface of the optical device that is to be cleaned, and a rest position, in which the holder positions the cleaning units away from the optical device, wherein the cleaning device is embodied in such a manner that each cleaning part of the cleaning units is moved over a subarea assigned to it of the surface to be cleaned, wherein the subareas can at least partly overlap.

\* \* \* \* \*

UNITED STATES PATENT AND TRADEMARK OFFICE
CERTIFICATE OF CORRECTION

PATENT NO. : 10,800,384 B2
APPLICATION NO. : 15/189353
DATED : October 13, 2020
INVENTOR(S) : Andreas Herrmann Page 1 of 1

It is certified that error appears in the above-identified patent and that said Letters Patent is hereby corrected as shown below:

In the Claims

Column 4, Claim 1, Line 63, reads:
"wherein the holder is has an annular"
Should read:
--wherein the holder has an annular--

Signed and Sealed this
First Day of December, 2020

Andrei Iancu
*Director of the United States Patent and Trademark Office*